(12) United States Patent
Strolz et al.

(10) Patent No.: US 10,114,474 B2
(45) Date of Patent: Oct. 30, 2018

(54) METHOD AND DEVICE FOR OPERATING AN INPUT DEVICE

(71) Applicant: Bayerische Motoren Werke Aktiengesellschaft, Munich (DE)

(72) Inventors: Michael Strolz, Munich (DE); Thomas Tille, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/698,171

(22) Filed: Apr. 28, 2015

(65) Prior Publication Data

US 2015/0241990 A1    Aug. 27, 2015

Related U.S. Application Data

(63) Continuation of application No. PCT/EP2013/071526, filed on Oct. 15, 2013.

(30) Foreign Application Priority Data

Oct. 29, 2012 (DE) .................. 10 2012 219 736

(51) Int. Cl.
*G06F 3/03* (2006.01)
*G06F 3/041* (2006.01)

(52) U.S. Cl.
CPC .......... *G06F 3/0304* (2013.01); *G06F 3/0418* (2013.01)

(58) Field of Classification Search
CPC .......... G06F 3/03; G06F 3/0304; G06F 3/042; G06F 3/0416; G06F 3/0418;
(Continued)

(56) References Cited

U.S. PATENT DOCUMENTS

| 6,266,057 B1 * | 7/2001 | Kuzunuki | G06F 3/033 |
| | | | 345/156 |
| 2008/0273755 A1 * | 11/2008 | Hildreth | G06F 3/017 |
| | | | 345/158 |

(Continued)

FOREIGN PATENT DOCUMENTS

| CN | 101375235 A | 2/2009 |
| DE | 10 2007 034 272 A1 | 1/2009 |

(Continued)

OTHER PUBLICATIONS

International Search Report (PCT/ISA/210) dated Jan. 21, 2014 with English translation (seven pages).

(Continued)

*Primary Examiner* — Nathan Danielsen
(74) *Attorney, Agent, or Firm* — Crowell & Moring LLP

(57) ABSTRACT

An input device has a predetermined touch-sensitive input region. A placement of an operating element in relation to the predetermined touch-sensitive input region is ascertained depending on at least one recorded image which represents a position and/or a placement of a predetermined operating element in a predetermined zone of the touch-sensitive input region. An input character is determined depending on the ascertained placement and a recorded measurement signal which represents an input position and/or an input movement profile on the predetermined touch-sensitive input region.

13 Claims, 3 Drawing Sheets

(58) Field of Classification Search
CPC ................. G06F 3/0425; G06F 3/0426; G06F 3/0487–3/04886; G06F 2203/0331; G06F 2203/04806
See application file for complete search history.

(56) References Cited

U.S. PATENT DOCUMENTS

| | | | |
|---|---|---|---|
| 2009/0002342 A1 | 1/2009 | Terada et al. | |
| 2009/0132130 A1* | 5/2009 | Kumon | B60K 35/00 701/49 |
| 2009/0309848 A1* | 12/2009 | Terada | G06F 3/0425 345/173 |
| 2010/0289754 A1* | 11/2010 | Sleeman | G06F 3/0416 345/173 |
| 2010/0328221 A1 | 12/2010 | Happonen et al. | |
| 2011/0285657 A1 | 11/2011 | Shimotani et al. | |
| 2012/0105613 A1* | 5/2012 | Weng | G06F 3/017 348/77 |
| 2013/0088465 A1* | 4/2013 | Geller | G06F 3/03545 345/179 |
| 2014/0055396 A1* | 2/2014 | Aubauer | G06F 3/04883 345/173 |

FOREIGN PATENT DOCUMENTS

| | | |
|---|---|---|
| DE | 10 2008 019 731 A1 | 10/2009 |
| DE | 10 2009 018 682 A1 | 10/2010 |
| EP | 1 977 926 A2 | 10/2008 |
| EP | 1 980 935 A1 | 10/2008 |

OTHER PUBLICATIONS

German Search Report dated May 27, 2013 with partial English translation (10 pages).
Chinese Office Action issued in Chinese counterpart application No. 201380056598.X dated Oct. 21, 2016, with English translation (Fourteen (14) pages).

* cited by examiner

METHOD AND DEVICE FOR OPERATING AN INPUT DEVICE

CROSS REFERENCE TO RELATED APPLICATIONS

This application is a continuation of PCT International Application No. PCT/EP2013/071526, filed Oct. 15, 2013, which claims priority under 35 U.S.C. § 119 from German Patent Application No. 10 2012 219 736.2, filed Oct. 29, 2012, the entire disclosures of which are herein expressly incorporated by reference.

BACKGROUND AND SUMMARY OF THE INVENTION

The invention relates to a method and device for operating an input device which has a predetermined touch-sensitive input region, and also an operator control system.

So-called touch panels can be found in the field of computers, in particular with respect to notebooks and tablet computers, and also a large number of mobile telephones. An electronic device can be controlled via a touch panel by a special input device or a finger making contact with said touch panel.

The intention is to supplement a central operator control unit with a touch panel as a further input means in the field of motor vehicles too, in order to control an extremely wide variety of vehicle functions.

The object on which the invention is based is that of providing a method and device for operating an input device and also providing an operator control system, which method, device and operator control system contribute to improving the reliability of identification of a character which is input on a touch-sensitive input region of the input device.

This and other objects are achieved according to a first and second aspects of the invention by a method and a corresponding device, respectively, for operating an input device, wherein the input device comprises a predetermined touch-sensitive input region. A placement of the operating element in relation to the predetermined touch-sensitive input region is ascertained depending on at least one recorded image which represents a position and/or a placement of a predetermined operating element in a predetermined zone of the touch-sensitive input region. An input character is determined depending on the ascertained position and a recorded measurement signal which represents an input position and/or an input movement profile on the predetermined touch-sensitive input region.

This can advantageously contribute to a character, which is input on a touch-sensitive input region of the input device, being identified more reliably. It allows various placements of the operating element to be taken into account when ascertaining the input character. This advantageously allows the input character to be reliably determined, independently of a position of an operator of the touch-sensitive input region in relation to the touch-sensitive region. Furthermore, this can allow reliable identification of the input character independently of whether the character is input directly or indirectly with a left-hand-side body part or a right-hand-side body part.

Reliable identification of the respective input characters can increase operator satisfaction and therefore the acceptance of an input device of this kind.

In an advantageous refinement of the first and second aspect, the operating element comprises at least one body part of a user of the input apparatus. This allows simple operator control by the user. The body part can be, for example, one or more finger parts, one or more fingers, a hand and/or an arm.

In a further advantageous refinement of the first and second aspect, the recorded image represents the position and/or the placement of the predetermined operating element in the predetermined zone of the touch-sensitive input region during input of a character in the predetermined touch-sensitive input region by way of the operating element. This has the advantage that the placement in relation to an actual character input can be determined more accurately and more reliably. A determined placement depending on at least one image which is recorded as the operating element approaches the touch-sensitive input region represents, however, an estimated placement in relation to the actual character input.

In a further advantageous refinement of the first and second aspect, the placement comprises at least one angular placement of the operating element in relation to the predetermined touch-sensitive input region. This advantageously allows the input character to be determined in a very simple manner. The angular placement can be ascertained in a very simple manner, and the input character can be ascertained in a simple manner depending on the ascertained angular placement of the operating element in relation to the touch-sensitive input region.

In a further advantageous refinement of the first and second aspect, the input character is determined from a quantity of predefined input characters. This has the advantage that the input character can be ascertained very quickly. Setpoint input positions and/or setpoint input profiles can be predetermined for the predefined input characters, and evaluation can take place depending on a comparison of actual and setpoint values.

In a further advantageous refinement of the first and second aspect, a correction angle is ascertained depending on the ascertained placement, and the input character is ascertained depending on the correction angle. The input character can be ascertained in a simple manner depending on the correction angle.

In a further advantageous refinement of the first and second aspect, the input device includes a touch-sensitive display having a predetermined touch-sensitive display area, and the predetermined touch-sensitive input region comprises at least part of the display area. The touch-sensitive display can be used as an interactive operator control element with an input and output function. A viewer of the display can receive optical feedback relating to an input and/or further information at the same time or substantially at the same time as performing an operator control operation. The feedback and/or the further information can be displayed with specific graphical elements or in an animated manner, and thereby allow improved intuitive understanding by the viewer and improved intuitive operator control.

In a further advantageous refinement of the first and second aspect, the input device is arranged in a vehicle, and the ascertained placement of the predetermined operating element in relation to the predetermined touch-sensitive input region is used to ascertain whether the input has been performed by a vehicle driver and/or a passenger. This has the advantage that, when execution of a predetermined vehicle function is associated with the ascertained input character or several input characters in each case, it is possible to distinguish between whether the vehicle driver or the passenger is accessing the respective vehicle function system. Therefore, operator control access operations, which can excessively distract the vehicle driver from his driving task, can be prevented.

In a further advantageous refinement of the first and second aspect, at least a first input character and a second input character are associated with at least one predetermined operator control function of the input apparatus, wherein the respective first input character includes an input placement and/or an input movement profile, which input placement or input movement profile is indirectly or directly executed by a right-hand-side body part of a user of the input apparatus, and the second input character includes an input placement and/or an input movement profile, which input placement or input movement profile is indirectly or directly executed by a left-hand-side body part of a user of the input apparatus. The ascertained placement is used to determine whether the ascertained input character is one of the right-hand-side or left-hand-side input characters. The at least one operator control function comprises a selection function, a display function, an input function and/or a text input function. Therefore, a quantity of possible input characters from the quantity of predefined input characters can be ascertained very quickly, and the input character can be ascertained from the quantity of possible input characters which is smaller than the quantity of predefined input characters. Furthermore, this has the advantage that the respective input character can be determined in a reliable manner, independently of a position of the operator in relation to the touch-sensitive input area. When arranged in a vehicle, the input device can be used both by a vehicle user who indirectly or directly performs the input operation by way of a right-hand-side body part and also by a vehicle user who indirectly or directly performs the input operation by way of a left-hand-side body part.

According to a third aspect, the invention is distinguished by an operator control system having a device according to the second aspect, having an input device which includes a predetermined touch-sensitive input region, and having an image recording device. The image recording device is designed to record an image or an image sequence, which image or image sequence represents a position and/or placement of a predetermined operating element in a predetermined zone of the touch-sensitive input region, and to pass on image data relating to the recorded image or the image sequence to the apparatus.

Advantageous refinements of the first and second aspect also apply to the third aspect in this case.

Other objects, advantages and novel features of the present invention will become apparent from the following detailed description of one or more preferred embodiments when considered in conjunction with the accompanying drawings.

DETAILED DESCRIPTION OF THE DRAWINGS

Elements which have the same structure or function are provided with the same reference symbols throughout the figures.

Figure 1:
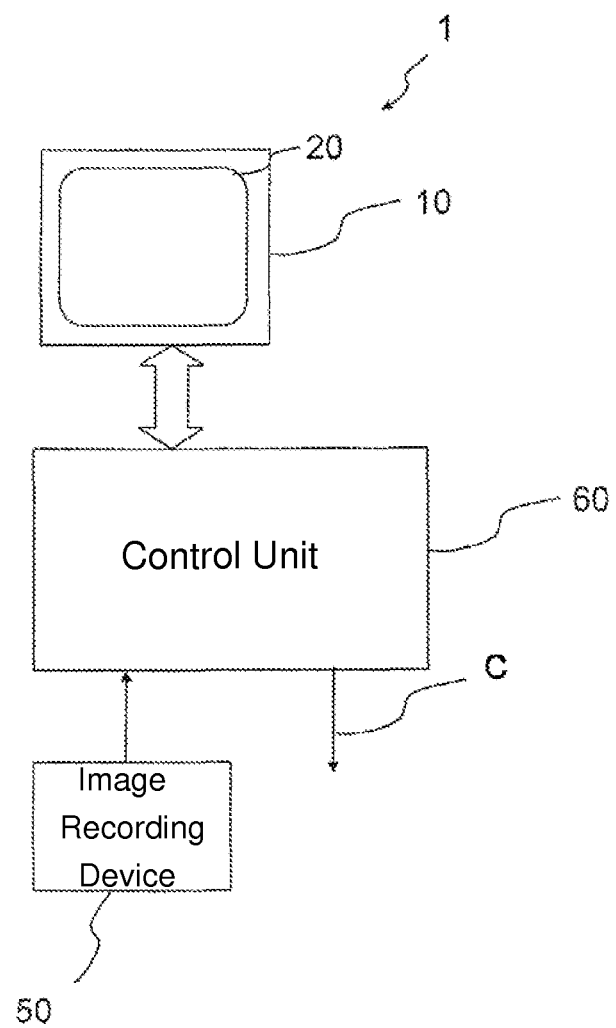
FIG. 1 is a block diagram for an exemplary embodiment of an operator control system for a vehicle.

FIG. 1 shows an operator control system 1. The operator control system 1 includes an input device 10 having at least one touch-sensitive predetermined input region 20. The control system 1 further includes a control device 60. The input device 10 is preferably arranged in a vehicle, in particular in a motor vehicle.

In the exemplary embodiment shown in FIG. 1, the input device 10 has a touch-sensitive display having a predetermined touch-sensitive display area. The predetermined touch-sensitive input region 20 comprises at least part of the display area.

The control unit 60 can also be called a device for operating the input device 10. When used for the vehicle, the control unit 60 can be arranged in the vehicle or outside the vehicle. The control unit 60 comprises, for example, a computer unit and a program memory. The control unit 60 can comprise, for example, a central control unit in the vehicle. The control unit 60 is coupled to the input device 10 such that they exchange signals.

Furthermore, the operator control system 1 has an image recording device 50. The image recording device 50 is associated with the control unit 60. As an alternative, it is possible for the control unit 60 to include the image recording device 50.

The image recording device 50 preferably is a camera, for example a video camera. The image recording device 50 has a recording region which captures at least one predetermined zone of the predetermined touch-sensitive input region 20. The image recording device 50 can also be one or more cameras.

When used in a vehicle, the image recording device 50 is arranged on or in the vehicle. The image recording device 50 is arranged, for example, on an inner face of a vehicle roof.

The image recording device 50 is designed to record an image or an image sequence, which image or image sequence represents a position and/or placement of a operating element 30 in a predetermined zone of the touch-sensitive input region 20.

The image recording device 50 is coupled to the control unit 60 such that they exchange signals, and is further designed to pass on image data relating to the recorded image or the image sequence to the control unit 60.

Figure 2:
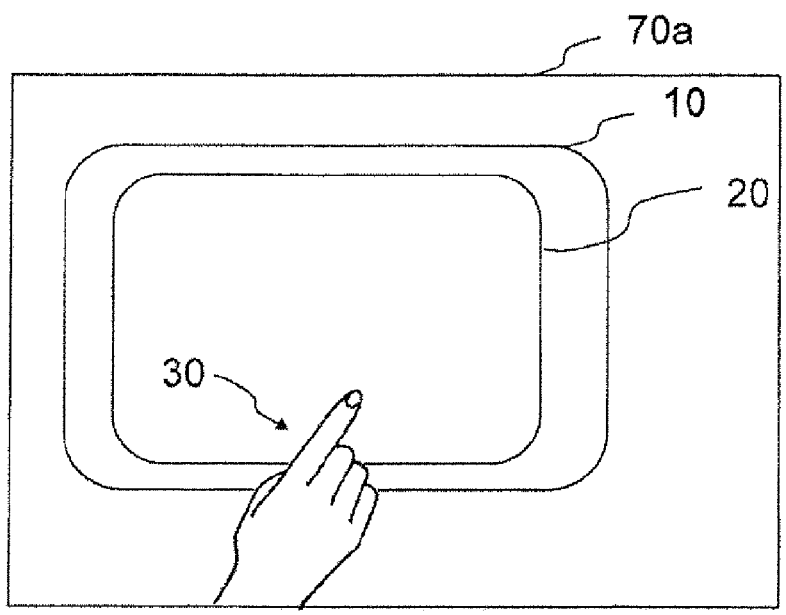
FIG. 2 is a first image which represents a position and/or a placement of a predetermined operator control element in a predetermined zone of a touch-sensitive input region.

FIG. 2 shows a first image 70a which represents a position and/or placement of a predetermined operating element 30 in a predetermined zone of a touch-sensitive input region 20.

The operating element 30 is used for inputting a character. The operating element 30 preferably is at least one body part of a user of the input device 10. The at least one body part may be one or more fingers in the case shown.

The touch-sensitive input region 20 is arranged, for example, in a center console of the vehicle. This means that, for example in the case of a vehicle which is designed to be driven on the right side of the road, the touch-sensitive region is arranged at least partially offset to a right-hand side of the vehicle in relation to a body center line of the driver in the forward direction of travel of the vehicle, and is arranged at least partially offset to a left-hand side of the vehicle in relation to a body center line of the passenger.

Placement of a hand for operator control of a touch-sensitive input region 20 of this kind therefore differs from placement of a hand for operator control of a touch-sensitive screen of a mobile terminal and/or of a mobile computer. A screen of this kind is preferably held in front of a forward-facing body of the user of the screen or is arranged in front of a forward-facing body.

On account of this changed position, specific input characters, such as letters, a scroll function and/or a zoom function, are, for example, input with a different movement profile and/or a changed contact area of the operating element 30 in comparison to input on the touch-sensitive screen of the mobile terminal and/or of the mobile computer.

Since the touch-sensitive input region 20 is predominantly fixedly arranged in the vehicle, the placement of the hand and, related to this, the placement of the finger also differ, for example, depending on the body size of the respective vehicle user.

The control unit 60 is designed to ascertain a position of the operating element 30 in relation to the predetermined touch-sensitive input region 20 depending on at least one recorded image which represents a position and/or a placement of a predetermined operating element 30 in a predetermined zone of the touch-sensitive input region 20. An input character is determined depending on the ascertained placement and a recorded measurement signal which represents an input position and/or an input movement profile on the predetermined touch-sensitive input region 20.

The input character is determined, for example, from a quantity of predefined input characters. At least one letter, at least one number, a selection function, a display function and/or an input function are/is associated with the input character. A selection function can include a menu selection. A display function can include, for example, scrolling, zooming and/or shifting a graphical element on the touch-sensitive input area. A vehicle function, for example, can be associated with the respective input function. If one of the input characters with which one of the vehicle functions is associated is determined, a control signal C, for example, is output by the control unit 60 in order to control execution of this vehicle function.

One image or several images is/are preferably evaluated, said image or images representing the position and/or the placement of the predetermined operating element 30 in the predetermined zone of the touch-sensitive input region 20 during input of a character by means of the operating element 30 in the predetermined touch-sensitive input region 20.

As an alternative or in addition, one or more images can be evaluated, said image or images representing the placement of the predetermined operating element 30 in the predetermined zone of the touch-sensitive input region 20 during a phase in which the operating element 30 is approaching the predetermined touch-sensitive input region 20.

The placement of the operating element 30 in relation to the predetermined touch-sensitive input region 20 can include at least one angular placement of the operating element 30 in relation to the predetermined touch-sensitive input region 20.

By way of example, the control unit 60 is designed to determine a correction angle depending on the ascertained placement, and to determine the input character depending on the correction angle. By way of example, a corrected input position or a corrected input movement profile is ascertained depending on an ascertained actual input position and/or an ascertained actual input movement profile and depending on the correction angle. The corrected input position and/or the corrected input movement profile are/is then compared, for example, with a predetermined setpoint input position or a predetermined setpoint input movement profile. Predetermined pattern comparison algorithms can be used for this purpose.

Figure 3:
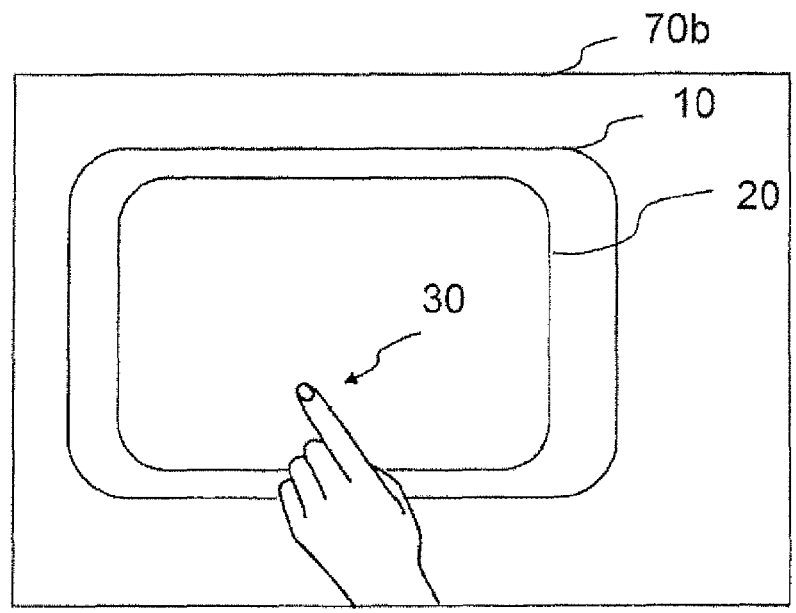
FIG. 3 is a second image which represents a further position and/or a further placement of the predetermined operating element in the predetermined zone of the touch-sensitive input region.

FIG. 3 shows a second image 70b which represents a further position and/or further placement of the predetermined operating element 30 in the predetermined zone of the touch-sensitive input region 20. In the example shown in FIG. 3, the user of the input device 10, for example the passenger, uses a left-hand-side body part to input the character.

The control unit 60 is designed to ascertain whether the input has been performed by a vehicle driver and/or a passenger, for example depending on the ascertained placement of the predetermined operating element in relation to the predetermined touch-sensitive input region 20.

When an input is made using the left-hand-side body part, specific input characters are, for example, input in comparison to when an input is made using a right-hand-side body part with a different movement profile and/or a changed contact area of the body part.

Furthermore, at least a first input character and a second input character can be associated with at least one predetermined operator control function of the input device 10, for example, wherein the respective first input character includes an input placement and/or an input movement profile, which input placement or input movement profile is indirectly or directly executed by a right-hand-side body part of a user of the input device 10, and the second input character includes an input placement and/or an input movement profile, which input placement or input movement profile is indirectly or directly executed by a left-hand-side body part of a user of the input device 10. The control unit 60 is designed, for example, to ascertain whether the determined input character is one of the right-hand-side input characters or one of the left-hand-side input characters, depending on the ascertained placement.

LIST OF REFERENCE SYMBOLS

1 Operator control system
10 Input device
20 Touch-sensitive input region
30 Operating element
50 Image recording device
60 Control unit
70a First image
70b Second image
C Control signal The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating an input device having a predetermined touch-sensitive input region, the method comprising the acts of:
   ascertaining a placement of an operating element in relation to the predetermined touch-sensitive input region, the ascertaining being based on at least one recorded image representing a position and/or a placement of a predetermined operating element in a predetermined zone of the touch-sensitive input region;
   wherein the ascertained placement of the operating element comprises at least one ascertained angular placement of the operating element in relation to the predetermined touch-sensitive region,
   ascertaining a correction angle depending on the ascertained placement of the operating element; and
   determining an input character based on the ascertained placement and a recorded measurement signal, the recorded measurement signal representing an input position and/or an input movement profile on the touch-sensitive input region, and based on the correction angle.

2. The method according to claim 1, wherein the operating element is at least one body part of a user of the input device.

3. The method according to claim 2, wherein the recorded image represents the position and/or the placement of the predetermined operating element during input of a character into the predetermined touch-sensitive input region via the operating element.

4. The method according to claim 1, wherein the recorded image represents the position and/or the placement of the predetermined operating element during input of a character into the predetermined touch-sensitive input region via the operating element.

5. The method according to claim 4, wherein the input character is determined from a quantity of predefined input characters.

6. The method according to claim 1, wherein the input character is determined from a quantity of predefined input characters.

7. The method according to claim 1, wherein
the input device comprises a touch-sensitive display having a predetermined touch-sensitive display area, and
the predetermined touch-sensitive input region is at least part of the predetermined touch-sensitive display area.

8. The method according to claim 1, wherein the input device is arranged in a vehicle, the method further comprising the act of:
determining whether the input device is being operated by a vehicle driver or a vehicle passenger based on the ascertained placement of the predetermined operating element in relation to the predetermined touch-sensitive input region.

9. The method according to claim 1, wherein the at least one angular placement of the operating element is determined by evaluating said at least one recorded image.

10. The method according to claim 9, wherein the at least one angular placement of the operating element is determined by evaluating at least one recorded image captured during a phase in which the operating element is approaching the predetermined touch-sensitive input region.

11. A method for operating an input device having a predetermined touch-sensitive input region, the method comprising the acts of:
ascertaining a placement of an operating element in relation to the predetermined touch-sensitive input region, the ascertaining being based on at least one recorded image representing a position and/or a placement of a predetermined operating element in a predetermined zone of the touch-sensitive input region; and
determining an input character based on the ascertained placement and a recorded measurement signal, the recorded measurement signal representing an input position and/or an input movement profile on the touch-sensitive input region,
wherein the ascertained placement of the operating element comprises at least one ascertained angular placement of the operating element in relation to the predetermined touch-sensitive region,
wherein the input device is arranged in a vehicle, in which at least a first input character and a second input character are associated with at least one predetermined operating control function of the input device, wherein
a respective first input character comprises an input placement and/or an input movement profile, said input placement or said input movement profile being directly or indirectly executed by a right-hand-side body part of a driver of the vehicle as the operating element,
a respective second input character comprises an input placement and/or an input movement profile, said input placement or said input movement profile being directly or indirectly executed by a left-hand-side body part of a passenger of the vehicle as the operating element, and
the ascertained placement is used to determine whether the determined input character is one of a right-hand-side or a left-hand-side input character.

12. A device for operating an input device having a predetermined touch-sensitive input region, the device comprising a control unit configured to execute a program to:
ascertain a placement of an operating element in relation to the predetermined touch-sensitive input region based on at least one recorded image representing a position and/or a placement of a predetermined operating element in a predetermined zone of the touch-sensitive input region;
wherein the ascertained placement of the operating element, which is ascertained based on the at least one recorded image, comprises at least one ascertained angular placement of the operating element in relation to the predetermined touch-sensitive region,
ascertain a correction angle depending on the ascertained placement of the operating element; and
determine an input character based on the ascertained placement and a recorded measurement signal, the recorded measurement signal representing an input position and/or an input movement profile on the touch-sensitive input region, and based on the correction angle.

13. An operator control system, comprising:
an electronic control unit;
an input device having a predetermined touch-sensitive input region;
an image recording device configured to record an image or an image sequence representing a position and/or a placement of a predetermined operating element in a predetermined zone of the predetermined touch-sensitive input region, the image recording device being further configured to transmit image data related to the recorded image or image sequence to the electronic control unit;
wherein the electronic control unit is operatively configured to execute a program to:
ascertain a placement of an operating element in relation to the predetermined touch-sensitive input region based on at least one recorded image representing a position and/or a placement of the predetermined operating element in a predetermined zone of the touch-sensitive input region;
wherein the ascertained placement of the operating element, which is ascertained based on the at least one recorded image, comprises at least one ascertained angular placement of the operating element in relation to the predetermined touch-sensitive region,
ascertain a correction angle depending on the ascertained placement of the operating element; and
determine an input character based on the ascertained placement and a recorded measurement signal, the recorded measurement signal representing an input position and/or an input movement profile on the touch-sensitive input region, and based on the correcting angle.

* * * * *